United States Patent [19]

Hayashida et al.

[11] Patent Number: 5,204,887
[45] Date of Patent: Apr. 20, 1993

[54] X-RAY MICROSCOPE

[75] Inventors: Masami Hayashida, Atsugi; Yutaka Watanabe, Isehara; Masahito Niibe; Takashi Iizuka, both of Atsugi; Yasuaki Fukuda, Hadano, all of Japan

[73] Assignee: Canon Kabushiki Kaisha, Tokyo, Japan

[21] Appl. No.: 945,578

[22] Filed: Sep. 16, 1992

Related U.S. Application Data

[63] Continuation of Ser. No. 708,249, May 31, 1991, abandoned.

[30] Foreign Application Priority Data

Jun. 1, 1990 [JP] Japan ................................ 2-143870

[51] Int. Cl.$^5$ .............................................. G21K 7/00
[52] U.S. Cl. ........................................ 378/43; 378/145
[58] Field of Search ................................ 378/43, 145

[56] References Cited

U.S. PATENT DOCUMENTS

| | | | |
|---|---|---|---|
| 4,525,853 | 6/1985 | Keem et al. | 378/84 |
| 4,870,674 | 9/1989 | Schmahl et al. | 378/43 |
| 4,912,737 | 3/1990 | Ohsuka et al. | 378/43 |

FOREIGN PATENT DOCUMENTS

| | | |
|---|---|---|
| 1119800 | 11/1989 | Japan . |
| 3071100 | 3/1991 | Japan . |
| 87/00644 | 1/1987 | PCT Int'l Appl. . |

OTHER PUBLICATIONS

"Compact scanning soft-X-ray microscope using a laser produced plasma source", by J. A. Trail et al., Optics Letters, vol. 14, No. 1, Jun. 1989 p. 539.

"A scanning photoelectron microscope at alladdin", Nuclear Instruments & Methods in Physics Research. Sec. A, vol. 266, No. 1, Apr. 1988, pp. 303-307, Amsterdam, NL; F. Cerrina et al.

"X-Ray microscopy with synchrotron radiation at the electron storage ring at the electron storage ring bessy in Berlin" by B. Niemann et al. Nuclear Instruments and Methods Section a. vol. 246, Nos. 1-3, May 1986, pp. 675-680 Amsterdam, NL.

"Monochromatization by multilayered optics on a cylindrical reflector and on an ellipsoidal focusing ring" by G. F. Marchsall (SPIE vol. 691, X-Ray Imaging II (1986)).

*Primary Examiner*—Craig E. Church
*Attorney, Agent, or Firm*—Fitzpatrick, Cella, Harper & Scinto

[57] ABSTRACT

A method and device for imaging an object illuminated by an X-ray beam, through a zone plate, is disclosed. A concave mirror with a multilayered film is disposed on a path of the X-ray beam to reflect the same and collect the same onto the object.

47 Claims, 3 Drawing Sheets

X-RAY MICROSCOPE

This application is a continuation of application Ser. No. 07/708,249 filed May 31, 1991 which is now abandoned.

FIELD OF THE INVENTION AND RELATED ART

This invention relates generally to an X-ray microscope.

In X-ray microscopes, there are contact type, scan type and imaging type. Of these types, the imaging type microscope has highest spatial resolution and, therefore, many studies have been made to this along developments of X-ray optical elements.

Generally, an imaging type X-ray microscope comprises a light source, an illumination optical system (illumination system), a sample (subject of observation), an imaging optical system (imaging system) and a detector. The spatial resolution of an X-ray microscope differs with an optical element used as the imaging optical system. Examples of optical elements usable as the imaging optical system are a Fresnel zone plate, a grazing incidence reflector and a multilayered-film reflector. The theoretical resolution of an imaging optical system that uses a Fresnel zone plate is of the order of the width of the outermost ring zone. Actually, with this type of imaging optical system, a resolution of about 50 nm is attainable.

With an imaging system using a grazing incidence reflector, the theoretical resolution is about a few times the wavelength. However, in this type imaging system, the roughness or configuration error of the reflection mirror surface affects the resolution. Therefore, to attain the theoretical resolution, high precision is required in respect to the surface roughness and configuration. By way of example, a precision of nanometer order will be necessary.

Generally, to attain such mirror surface machining precision is very difficult. As a result, at present, the resolution of a Wolter type mirror optical system that uses a grazing incidence reflector is as low as about 1 micron.

As for an imaging optical system using a multilayered-film reflector, high surface precision and configuration precision are required as in the imaging optical system using a grazing incidence reflector. Additionally, in respect to the film thickness precision, extraordinarily high precision of 1/10 nm order is required. Consequently, it is very difficult to attain high resolution, as with the case of an optical system using a grazing incidence reflector. For these reasons, currently, many X-ray microscope studies are being made in respect to ones of the type that the imaging optical system comprises a Fresnel zone plate.

Generally, a Fresnel zone plate has a low diffraction efficiency, and in many cases the X-ray microscope should be equipped with a bright light source or a bright illumination system. Frequently, synchrotron radiation light is used as a light source. In some cases, as a brighter light source, an insertion type light source such as undulator or the like is used. Since, however, there are many limitations in increasing the luminance of a light source, it is strongly desired to improve the energy efficiency of an illumination system to thereby increase the brightness.

A conventional X-ray microscope having a Fresnel zone plate in its imaging system uses a concave diffraction grating or a Fresnel zone plate in its illumination system. These elements have a light collecting function for attaining a bright illumination system as well as a spectroscopic function for selection of a beam of a particular wavelength or wavelengths. Also, there is a case wherein a flat diffraction grating and a concave mirror are used in combination, with the spectroscopic function and the light collecting function being provided separately.

SUMMARY OF THE INVENTION

Generally, a Fresnel zone plate used in an illumination system has alternately disposed transparent concentric ring-like zones (transparent with respect to X-ray, for example) and non-transparent concentric ring-like zones (non-transparent with respect to X-ray). The total area of the non-transparent zones is about a half of the whole area, and about 50% of light is blocked. Also, about a half of the remaining 50% is not diffracted and goes straight. Thus, if such an amplitude type Fresnel zone plate is used, there is an inconvenience of a large decrease in light quantity.

With respect to positive and negative first orders, even an idealistically fabricated Fresnel zone plate has a low diffraction efficiency which is not greater than 10%. In an attempt to increasing such a low diffraction efficiency, a Fresnel zone plate (phase type Fresnel zone plate) wherein a non-transparent portion is formed by a thin film to provide a phase shift of $\pi$ has been proposed. The diffraction efficiency of such phase type Fresnel zone plate with respect to the positive and negative first orders is about 10–30%. In order to reduce absorption of the phase type Fresnel zone plate and to reduce the phase difference, the film thickness should be maintained thin and constant with good precision. Inconveniently, therefore, with this method it is not easy to obtain a large area. While a Fresnel zone plate having a very thin substrate of polyimide or silicon nitride has been proposed, it depends on the possibility of reducing the film thickness and attaining high precision. Therefore, inconveniently it is still difficult to obtain a large area.

If a concave diffraction grating or a flat diffraction grating is used in combination with a concave mirror to provide an illumination system, because of low reflectivity of the diffraction grating or the mirror, it is difficult to attain sufficient brightness. Further, since the wavelength resolution is higher by one order or more than that of the Fresnel zone plate, a beam of unnecessarily narrowed bandwidth is extracted. As a result, it is not easy to obtain a bright illumination system.

In conventional X-ray microscopes as described above, the efficiency of energy use is low, and a bright image is not formed and thus is not detected.

It is accordingly a primary object of the present invention to provide an imaging method or image detection method having good energy efficiency.

It is another object of the present invention to provide an imaging system or X-ray microscope having good energy efficiency.

In accordance with one aspect of the present invention, there is provided a method of imaging an object illuminated by an X-ray beam, through a zone plate, characterized in that: a concave mirror with a multilayered film is disposed on a path of the X-ray beam to reflect the same and collect the same onto the object.

In accordance with another aspect of the present invention, there is provided a method of imaging an object illuminated by an X-ray beam, through a zone plate, to detect an image of the object, characterized in that: a concave mirror with a multilayered film is disposed on a path of the X-ray beam to reflect the same and collect the same onto the object.

In accordance with a further aspect of the present invention, there is provided an imaging system, comprising: a concave mirror with a multilayered film, for reflecting X-rays from an X-ray source to collect them on an object; and a zone plate for forming an image of the object irradiated with the X-rays.

In accordance with a yet further aspect of the present invention, there is provided an X-ray microscope, comprising: an X-ray source for supplying X-rays; a concave mirror with a multilayered film, for reflecting the X-rays and collect them on a sample; a zone plate for forming a magnified image of the sample irradiated with the X-rays; and a detector for detecting the formed image.

In accordance with yet another aspect of the present invention, there is provided a method of imaging an object illuminated by an X-ray beam, characterized in that: the X-ray beam is reflected by a multilayered film mirror and is collected onto the object thereby; and that the object is imaged through a zone plate.

In accordance with a further aspect of the present invention, there is provided a method of detecting an image of an object illuminated by an X-ray beam, characterized in that: the X-ray beam is reflected by a multilayered film mirror and is collected onto the object thereby; and that the object is imaged through a zone plate.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
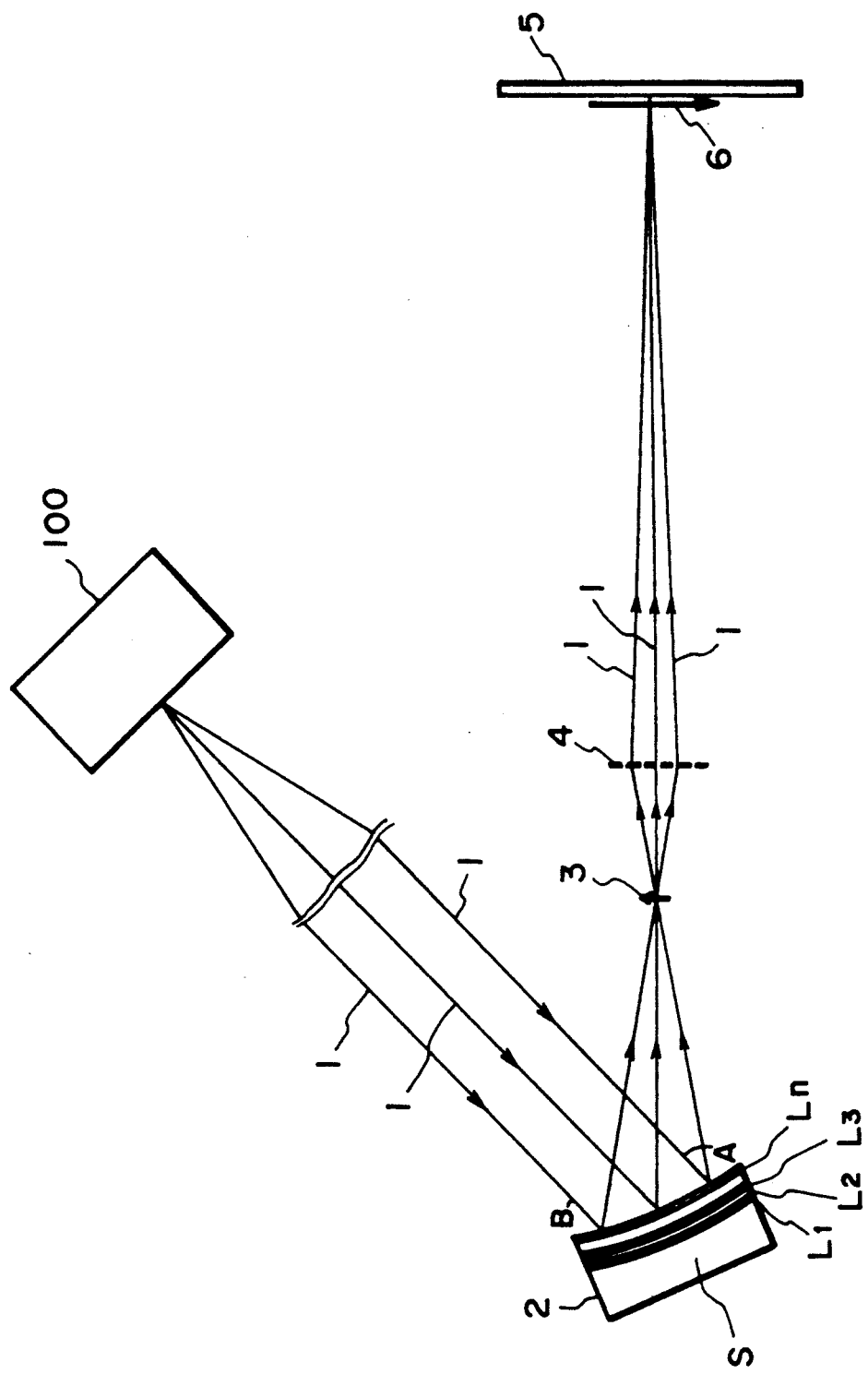
FIG. 1 is a schematic view of a main portion an X-ray microscope according to an embodiment of the present invention.

FIG. 1 is a schematic view of a main portion of an optical arrangement according to an embodiment of the present invention. Denoted at 1 in FIG. 1 are X-rays emitted by an X-ray source 100, and denoted at 2 is a multilayered-film concave reflection mirror having a smooth reflection surface for reflecting the X-rays 1. The reflection mirror 2 has a substrate S on which multilayered films L1, L2, L3, ... and Ln of a number (n) and of materials to be described later, are formed by deposition. Denoted at 3 is an object (sample) to be observed; at 4 is an imaging Fresnel zone plate; and at 5 is a detector. An image 6 of the object 3 is formed on the detector 5 surface. In this embodiment, no diffraction grating is provided on the path of X-rays and only one multilayered-film mirror is used.

In the present embodiment, the X-rays are reflected by the multilayered-film concave reflection mirror 2 and are collected on the object 3 surface. Simultaneously, wavelength selection is effected to meet the wavelength to be used. The X-rays transmissively scattered (diffracted) by the object 3 are incident on the Fresnel zone plate 4. In response, the zone plate 4 collects the received X-rays and forms an image 6 of the object 3 upon the detector 5 surface.

In the present embodiment, as an example, the light source 100 may comprise a synchrotron orbital radiation (SOR) source which emanates synchrotron radiation light. The reflection mirror 2 may comprise a substrate having its surface polished into a parabolic face on which alternating layers of Cr (chromium) and C (carbon) are formed.

X-rays emanating from the synchrotron radiation source may be partially blocked by an aperture means (not shown) and, as a result, a beam of 8 mm in a horizontal direction (parallel to the sheet of the drawing) and 3 mm in a perpendicular direction (perpendicular to the sheet of the drawing) may impinge on the multilayered-film concave mirror 2 surface. The mirror may preferably comprise a substrate S of silica polished into a paraboloid of revolution. As regards the configuration precision of the paraboloidal face of the mirror 2, an error of $-\lambda/3$ ($\lambda = 632.8$ nm) from an idealistic configuration will be adequate. As regards the surface roughness, a level of 2 Årms order is adequate. On such a substrate, alternate layers of Cr and C of a number of 501 (five hundred and one) may be formed, with the configuration precision and the surface roughness being substantially unchanged. The mirror 2 may be so set that the revolution plane of the paraboloid of revolution lies in a perpendicular plane and that the beam center (central beam of X-rays) is incident on the mirror at an angle of about 30 deg. as measured with respect to a perpendicular direction to the mirror surface.

At the opposite end portions A and B of the X-ray beam 1 in a horizontal plane, the angle of incidence on the reflecting mirror may be 28.2 deg. and 31.7 deg., respectively. As regards the thickness structure of the multilayered film of the reflecting mirror 2, the Cr layers L1, L3, L5, ... and L501 and the C layers L2, L4, L6, ... and L500 may have the same thicknesses, respectively. Additionally, in order to avoid shift in wavelength of reflected lights from respective portions of the reflection mirror at the focal point thereof, in a horizontal plane a film thickness distribution may be provided along the reflection surface of the mirror. For example, at the end portion A of the X-ray beam, the film thickness may be 8.4 Å (Cr layer) and 20.1 521 (C layer) while at the end portion B of the X-ray beam it may be 8.6 Å (Cr layer) and 21.0 Å (C layer). Between the end portions A and B, the film thickness may be continuously changed. The film thickness in the perpendicular direction may be constant.

In the present embodiment, there may be partial correspondence between the wavelengths of X-rays as reflected by the multilayered-film reflection mirror and the wavelengths of the X-rays as diffracted by the Fresnel zone plate. In order to avoid superposition of the zero-th order light (transmitted light) (which goes along the optical axis of the Fresnel zone plate 4) on the image 6 of the object as formed by the Fresnel zone plate 4, at an area on the reflection mirror adjacent to a portion as irradiated by the center of the X-ray beam, the multilayered film structure may be destroyed by means of ion beam projection, in a circular range of 100 micron diameter. With this destruction, it may be assured that the object 3 is irradiated with a beam which is inclined with respect to the Fresnel zone plate 4. In place of destroying the multilayered film structure, such an area may be covered with by a low-reflectivity material or a material with an appropriate optical constant in a sufficient thickness to attain low reflectivity. Alternatively, the multilayered film may originally formed except for such an area.

In a design example according to this embodiment of the present invention, the reflectivity of the concave reflection mirror 2 is about 30% (wavelength=50 Å). With this reflection mirror, an X-ray beam of a wavelength 50 Å is collected at a distance 66.7 mm (emission angle=30 deg.), and the beam spot size is about 10 microns. If the object (sample) 3 to be observed is placed at this position, the transmitted light passing the object 3 is collected by the Fresnel zone plate 4 upon the detector 5 surface, by which an image 6 is formed thereon. As regards the Fresnel zone plate 4, the radius of the innermost ring zone is 5.00 microns and that of the outermost ring zone is 61.44 microns. The number of the ring zones is 151 (one hundred and fifty five). The focal length is 5 mm. By placing an X-ray photographic film at the imaging position as the detector means 5 and by exposing the film, it is possible to detect the image 6.

The X-ray path may be covered by a vacuum container while the object (sample) 3 may be placed in an atmosphere by using a sample holder (not shown) with its X-ray inlet and X-ray outlet being sealed by means of polyimide films. Where diatom is used as the sample 3 and it is irradiated with X-rays of 5 nm wavelength, the transmitted X-rays will form a sharp image 6. According to simulations, the projection magnification of the image 6 upon the X-ray film is 150 x and the resolution is about 0.3 micron. The necessary exposure time is about 0.05 sec (beam current=150 mA). Such exposure time is very short as about 1/230 of that where a Fresnel zone plate of a radius 4.2 mm and ring zones of a number of 8001 (eight thousand and one) is used in the illumination system. Thus, with the present invention, a large increase in energy efficiency is attainable.

With this embodiment of the present invention as described above, since a multilayered-film reflection mirror is used in the illumination system, it is possible to easily fabricate a large area one as compared with a conventional illumination system using a Fresnel zone plate. Also, it is possible to provide a bright illumination system with a large reflectivity, wherein the wavelength resolution is not higher than required.

In the present embodiment, assuming now that the center wavelength of used X-rays is $\lambda$, the spectral half width at the center wavelength $\lambda$ is $\Delta\lambda$, the focal length and the radius of the Fresnel zone plate at the center wavelength $\lambda$ are f and m, respectively, and the parameter P is set to be expressed by equation (1) which reads:

$$P = 0.257831 \times (f\lambda/m^2)(\lambda/\Delta\lambda) \tag{1}$$

then, the components are so set as to satisfy the following relation:

$$10^{-2} \leq P \leq 10 \tag{1'}$$

Since $\lambda/\Delta\lambda$ in equation (1) is the wavelength resolution of the X-rays as spectrum-resolved by the multilayered film, the parameter P represents the wavelength resolution of the illumination system.

On the other hand, it is now assumed that, where a Fresnel zone plate 4 is used as an imaging element, the spatial resolution of the imaging element is $\delta_\infty$ if an illumination beam comprises a monochromatic beam while it is $\delta\lambda/\Delta\lambda$ if the wavelength resolution of the illumination system is $\lambda/\Delta\lambda$. Here, if a parameter W is set to be expressed by equation (2) which reads:

$$W = (\delta\lambda/\Delta\lambda)/\delta_\infty \tag{2}$$

then the parameter W can be used as a parameter that represents degradation of the imaging performance of the imaging element due to chromatic aberration.

Figure 2:
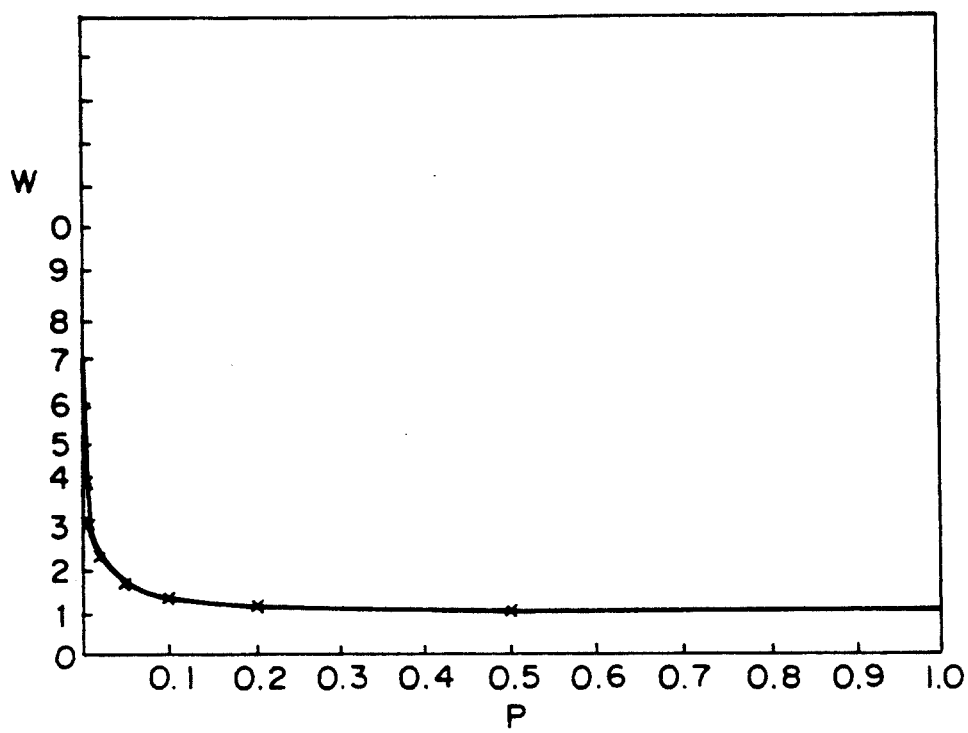
FIGS. 2 and 3 are graphs each showing a relationship between parameters P and W.
Figure 3:
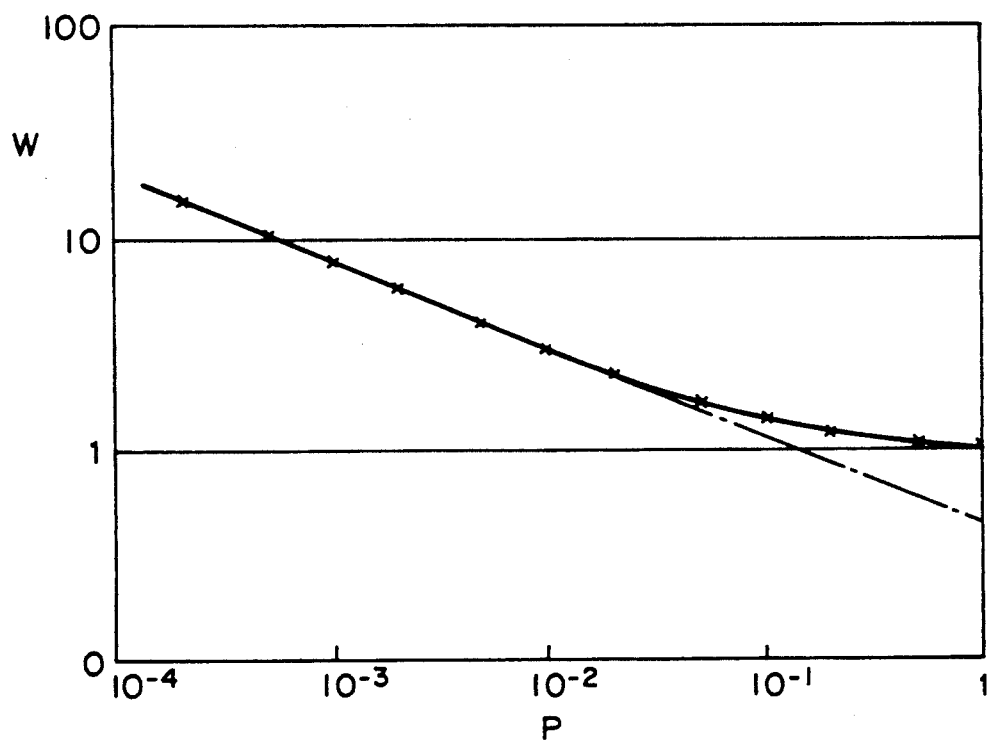

FIGS. 2 and 3 each depicts the relation between the parameters P and W. It is clear from FIG. 2 that, as the parameter P decreases, the parameter W increases suddenly. Namely, as the wavelength resolution P of the illumination system degrades (decreases), the imaging performance degrades quickly.

FIG. 3 depicts in a log-log graph the relation between the parameters P and W. It is seen in this graph that, as the parameter P decreases, the relation of the parameters P and W becomes more rectilinear. Namely, in a region in which the parameter P is small ($P \leq 10^{-2}$), the following is provided:

$$W \propto P^{-\alpha} \tag{3}$$

From FIG. 3, $\alpha$ is determined to be about 0.4. In the region in which the parameter P is small, the parameter W diverges exponentially with a negative exponent of the parameter P. The limit of starting divergence of the parameter W with an exponent of the parameter P, is $P = 10^{-2}$. If $P \geq 10^{-2}$, the degradation of the imaging performance of the imaging element may be admitted.

On the other hand, as the parameter P increases, the parameter W becomes close to "1" and the imaging performance improves. If $P = 1$, the imaging performance becomes substantially equal to that where monochromatic light is used. If the parameter P increases further, the imaging performance does not improve any more. To the contrary, the illumination light becomes dark and, at the wavelength resolution whereat $P \geq 10$ is provided, the beam intensity reduces to a fraction or 1/10. Thus, the advantage of using the multilayered-film reflection mirror is damaged.

For the foregoing reasons, in the present embodiment, it is desirable to use in an illumination optical system such a multilayered-film reflection mirror with wavelength resolution $\lambda/\Delta\lambda$ by which the parameter P is maintained in a range of $10^{-2}$ to 10, preferably in a range of $3 \times 10^{-2}$ to 1.

In the present embodiment, the wavelength resolution of the illumination beam obtainable from the multilayered-film concave reflection mirror may be so set as to provide a parameter P of 0.222. This may ensure a bright illumination system with which a sufficiently bright illumination beam may be obtained and the exposure time may be reduced largely and, additionally, the resolution of the Fresnel zone plate may not be decreased.

General features of the multilayered film of the reflection mirror of the present embodiment will be explained.

The multilayered film of the present embodiment may include alternate layers of two materials having different optical constants. The reflectivity of this multilayered film is determined by the wavelength used and the materials used as well as the film thickness structure. Generally, such two materials as having small absorption efficiencies with respect to a used wavelength and having a large difference in refractive index, may be selected and used. Such a material that has an absorption limit at a wavelength slightly shorter than a used wavelength may be used. However, this is not a requirement since, in an observation instrument such as an X-ray microscope, the wavelength resolution of the multilayered film affects the resolution. Thus, by selecting two materials having small absorption efficiencies and having a small difference in refractive index and by increasing the number of alternate layers, it is possible to obtain a multilayered film of high reflectivity and high wavelength resolution.

Generally, an X-ray reflector has a reflectivity of a few percentages to several ten percentages. It has been reported that a plane mirror with alternate layers of Rh and Si assured a reflectivity of about 80% (wavelength=130 Å). Therefore, with a multilayered-film reflection mirror, it is possible to attain an energy efficiency several times or several ten times higher than the diffraction efficiency of a diffraction grating or a Fresnel zone plate.

Also, with a multilayered-film reflection mirror, it is easy to obtain a large area mirror of a size of several ten millimeters and, therefore, it is possible to uses light from an X-ray source without a large loss. This is particularly effective where a divergence type source such as a laser plasma X-ray source or an electron beam X-ray source is used. As described hereinbefore, when a multilayered-film reflection mirror is used to provide an imaging element, high precision is required in respect to the substrate machining, the film thickness control of the multilayered film and the like. In the present embodiment, however, a multilayered-film reflection mirror is used only in an illumination system. Only required for the mirror is that it converges the X-rays. Therefore, as compared with a case where it is used as an imaging system, not so high precision is required.

Further, an additional advantage of a multilayered-film reflection mirror is that the wavelength resolution is not too high. The resolution of a Fresnel zone plate used in an imaging optical system is of an order of the width of its outermost ring zone which depends on the number of ring zones. Also, the wavelength resolution of a Fresnel zone plate is determined by the number of ring zones. Thus, the resolution and the wavelength resolution of a Fresnel zone plate are in a proportional relation. This means that a Fresnel zone plate having high resolution has high wavelength resolution and, therefore, the illumination system should have high wavelength resolution. If, however, the wavelength resolution of the illumination system is too high, the bandwidth of X-rays incident on the Fresnel zone plate becomes too narrow which renders the optical system dark. Since the resolution of the device is determined by the width of the outermost ring zone of the Fresnel zone plate, even if the bandwidth of X-ray is narrow, the resolution does not improve any more. For this reason, making the resolution of an illumination system too high is not preferable.

In a light collecting Fresnel zone plate conventionally used in an illumination optical system, if the area is made larger while retaining an appropriate focal length, the number of ring zones increases and the wavelength resolution increases. In many cases, the wavelength resolution of a light collecting Fresnel zone plate is higher by one order or more than that of an imaging Fresnel zone plate. Also, in the case of a diffraction grating, the wavelength resolution thereof is higher by one order or more than that of an imaging Fresnel zone plate.

As compared therewith, the wavelength resolution of a multilayered-film reflection mirror is of the same order of that of an imaging Fresnel zone plate. This is very effective in a case such as dynamic observation of a living sample, for example, where a bright optical system is required although the resolution may not be very high. As compared with a case where a Fresnel zone plate or a diffraction grating is used in an illumination optical system, use of a multilayered-film reflection mirror in an illumination optical system can provide an optical system which is brighter by several times than the former, even only in respect to the bandwidth selected.

Further, in respect to the area to be irradiated with X-rays or the attainable reflectivity, the multilayered-film reflection mirror is superior. Thus, it can provide a bright optical system. Therefore, the present embodiment is very effective to an observation device wherein a bright optical system is required.

A simplest form of light collecting optical system using a multilayered film may be provided by a multilayered-film reflection mirror having alternate layers of two different materials formed on a concave surface substrate. As X-rays are incident on the concave reflection mirror, they are spectrum-resolved and, at the same time, they are collected to irradiate a desired position of a sample (object).

The surface configuration of the concave surface substrate may differ, depending on the type of X-ray to be incident thereon. For X-rays of substantially parallel light such as synchrotron radiation, a paraboloid of revolution may be used. For divergent light from a point light source, an ellipsoid of revolution may be used. If the focal length is long or the energy width is wide, an approximate sphere may be used.

The thickness of the multilayered film can be determined by the X-ray wavelength to be used and the convergence conditions such as the angle of incidence. Generally, the film thickness is defined by alternate provision of two layers with constant thicknesses. However, in order to obtain a higher reflectivity, an appropriate film thickness structure may preferably be adopted. The multilayered film structure is not limited to alternate layers of two different materials. To avoid roughness of interface or to prevent diffusion, one or more intermediate layers may be used. Where a curved surface mirror is used, the angle of incidence changes with the position of incidence even if a parallel beam is inputted thereto. In consideration of this, the film thickness of a multilayered film may preferably be determined so as to provide a thickness distribution on the curved face, to thereby provide a substantially even spectral distribution of reflected light as spectrum-resolved by respective portions of the mirror surface.

Moreover, in consideration of convergence conditions of an optical system or limitations to device configuration, an optical system including plural multilayered-film mirrors may be used. By way of example, an optical system of Wolter type or Schwaltshilt type may be used.

Figure 4:
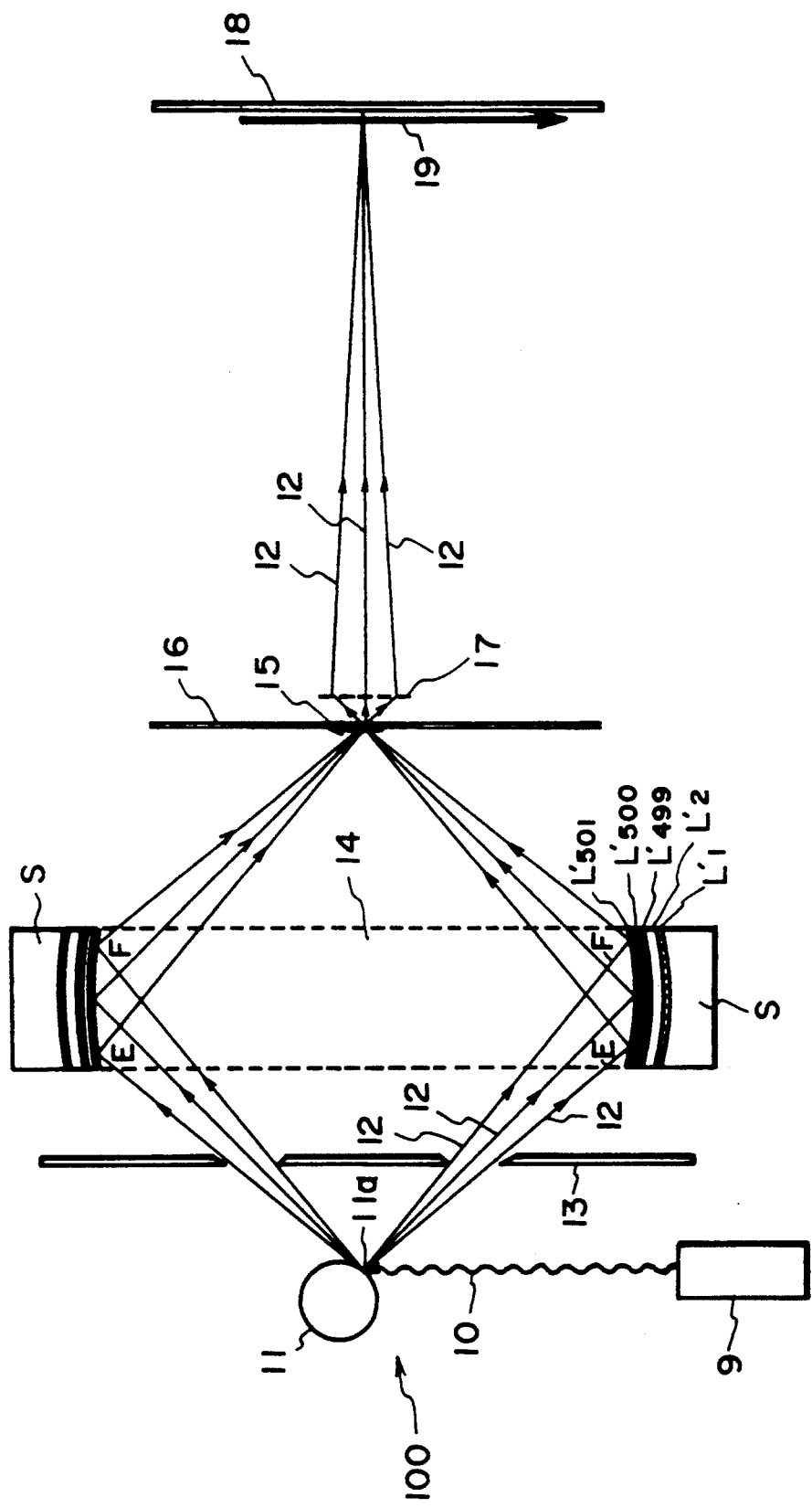
FIG. 4 is a schematic view of a main portion of an X-ray microscope according to another embodiment of the present invention.

FIG. 4 is a schematic view of a main portion of an optical arrangement of a second embodiment of the present invention.

In the present embodiment, an X-ray source comprises a laser plasma X-ray source, and an illumination optical system includes a multilayered-film reflection mirror having a multilayered film structure formed on an ellipsoid of revolution. An imaging optical system includes a Fresnel zone plate.

Denoted in the drawing at 9 is a laser; at 10 is a laser light; at 11 is a target; at 12 are X-rays; and at 13 is an X-ray aperture cutting aperture means. Denoted at 14 is a multilayered-film concave reflection mirror of cylindrical shape having a smooth reflection surface for reflecting the X-rays. It includes a mirror substrate S. On the inner cylindrical faces of the substrate, multilayered films L1, L2, L3, . . . and L501 of a number 501 (five hundred and one) are formed. Denoted at 15 is an object (sample) to be observed. Denoted at 16 is a scattered light cutting aperture means, and denoted at 17 is an imaging Fresnel zone plate. Denoted at 18 is a detector which comprises, for example, an X-ray photographic film for recording an enlarged image 19 of the sample 15. Also in this embodiment, no diffraction grating is provided on the X-ray path and only one multilayered-film reflection mirror is used.

In a design example, the laser plasma X-ray source 100 uses a YAG laser of 1.0 J/pulse and pulse width 10 ns, as the laser 9. The size of the light point on the target 11 is $10^{-2}$ mm$^2$. As the target 11, Mo is used. The target 11 has a cylindrical shape and it is rotatable about an axis parallel to its generating line, so as to change the pulse irradiation position continuously.

In this design example, the substrate S of the multilayered-film concave reflection mirror 14 has a cylindrical (ring) shape of a height 120 mm. It may be provided by cutting an ellipsoid of revolution having a major diameter of 424.3 mm and a minor diameter of 300 mm, along its plane of revolution. As regards the configuration precision, an error of about $\lambda/2$ ($\lambda=6328$ nm) from an idealistic configuration and surface roughness of 3 Arms are adequate. In this design example, alternate layers of Ni and C materials of a total number of 501 (five hundred and one) are formed on the substrate surface. The angle of incidence of the X-rays is set to be 45 deg. at the center the concave reflection mirror, and it changes continuously in the major axis direction of the mirror. At an end portion F of the region to be irradiated which portion is far from the X-ray source, the angle of incidence may be 43.1 deg. At another end portion E which is near to the X-ray source, the angle of incidence may be 47.9 deg. With respect to the minor axis direction, there may be no distribution of incidence angle. The thickness of the multilayered film may have a distribution along the major axis of the reflection mirror. At the end portion E near to the X-ray source, it may be 6.7 Å (Ni layer) and 24.2 Å (C layer) (constant thickness layers). At the end portion F far from the X-ray source, the thickness may be 7.1 Å (Ni layer) and 26.6 Å (C layer) (constant thickness layers). Between the end portions E and F, the film thickness may change continuously. With regard to the minor axis direction, the film thickness of the multilayered films may be constant. The angle of emission of the X-rays may be set to be 45 deg.

The X-ray emitting point 11a and the object (sample) to be examined are placed at the focal point positions of the ellipsoid of revolution of the multilayered-film concave reflection mirror 14. The X-rays 12 emitted by the laser plasma X-ray source 100 may be partially blocked by the aperture means 13, and the transmitted rays may be incident on the reflection mirror 14. The X-rays may be reflected by the reflection mirror and they may illuminate the sample 15. Thus, the sample 15 may be irradiated with beams inclined with respect to the optical axis of the Fresnel zone plate 17. The X-rays may be collected by the reflection mirror so as to form a beam spot of about 5 micron diameter, upon the sample 15 surface. Simultaneously, the wavelength selection of the X-rays may be effected, and the center wavelength may be 4.5 nm and the wavelength resolution $\lambda/\Delta\lambda$ may be about 170.

With regard of regards the Fresnel zone pate 17 for imaging the sample 15, in this design example, the width of its innermost ring zone is 4.24 microns and the width of its outermost ring zone is 60.15 microns. The number of ring zones is 201 (two hundred and one). In order to prevent transmission light (zero-th order light), advancing along the optical axis of the Fresnel zone plate, from directly impinging on the image 19 of the sample, the area of the Fresnel zone plate from the first to fourth ring zones from the inside are covered by an appropriate light blocking material so as to block the X-ray transmission. The focal length of the zone plate is 4 mm.

In this optical system, the parameter P (equation (1)) is set to be about 0.218, and the design is so set to satisfy a condition of $10^{-2} \leq P \leq 10$. By disposing an X-ray photographic film 18 at the imaging position and by exposing the same, the image 19 is detectable. As the sample 15, a membrane of silicon nitride patterned by gold may be used. The exposure may be effected with the X-ray path being maintained in a vacuum. According to simulations, in this case, an image 19 can be formed with an enlarging magnification of 250 x and a resolution of 25 microns. The exposure time is about 0.7 sec. which is about 1/460 of that where a grazing incidence type troidal diffraction grating without multilayered film is used. The reasons why the multilayered-film concave reflection mirror can provide an illumination system which is significantly brighter that the grazing incidence type troidal diffraction grating are that: it has low wavelength resolution; it can collect X-rays of a large solid angle; and it has high reflectivity.

While the invention has been described with reference to the structures disclosed herein, it is not confined to the details set forth and this application is intended to cover such modifications or changes as may come within the purposes of the improvements or the scope of the following claims.

We claim:

1. A method of imaging an object illuminated by an X-ray beam, through a zone plate, comprising the steps of:
   disposing a concave mirror with a multilayered film in a path of the X-ray beam;
   reflecting the X-ray beam from the concave mirror with the multilayered film; and
   collecting the reflected X-ray beam onto the object.

2. A method according to claim 1, wherein the disposing of the mirror includes positioning the mirror to form a reflected beam which is inclined with respect to an optical axis of the zone plate.

3. A method according to claim 2, wherein a central portion of the X-ray beam is received by a a first portion of the mirror having a first reflectivity, and a remaining portion of the X-ray beam is received by a second portion of the mirror having a second reflectivity, and wherein the first reflectivity is lower than the second reflectivity.

4. A method according to claim 3, wherein the first portion is not covered by the multilayered film.

5. A method according to claim 3, wherein at the first portion and multilayered film structure has been destroyed.

6. A method according to claims 1 or 2, further comprising the steps of detecting a formed image of the object and preventing a ray emanating from the object along an optical axis of the zone plate from being superposed on the formed.

7. A method according to claim 6, further comprising blocking with respect to a central portion of the zone plate and a plurality of ring zones of the zone plate around the central portion, the advancement of a ray along the optical axis of the zone plate.

8. A method according to claim 1, wherein the following condition is satisfied:

$$0.1 \leq 0.257831 \times [(f\lambda)/(rn)^2] \times (\lambda/\Delta\lambda) \leq 10$$

where $\lambda$ is the center wavelength of the spectrum of a reflected beam to be collected on the object, $\Delta\lambda$ is a half width of the spectrum, f is the focal length of the zone plate with respect to the center wavelength, and rn is the radius of the zone plate.

9. A method according to claim 1, further comprising changing the thickness of the multilayered film of the mirror with respect to a predetermined direction along the surface of the mirror to compensate for a change in wavelength of a reflected beam dependent upon the position on the mirror.

10. An imaging system for imaging an object illuminated by an X-ray source on a detector, comprising:
   a concave mirror with a multilayered film, for reflecting X-rays from the X-ray source to collect them onto the object; and
   a zone plate for forming an image of the object irradiated with the X-rays.

11. An imaging system according to claim 10, wherein said mirror forms a reflected beam which is inclined with respect to an optical axis of said zone plate.

12. An imaging system according to claim 11, wherein said mirror has a first portion having a first reflectivity, for receiving a central portion of the X-ray beam, and a second portion having a second reflectivity, for receiving the remaining portion of the X-ray beam, and wherein the first reflectivity is lower than the second reflectivity.

13. An imaging system according to claim 12, wherein said first portion is not covered by said multilayered film.

14. An imaging system according to claim 12, wherein at said first portion said multilayered film structure has been destroyed.

15. An imaging system according to claim 10 or 11, further comprising a filter for preventing a ray, emanating from the object along an optical axis of said zone plate, from being superposed on the formed image.

16. An imaging system according to claim 15, further comprising a blocking member for blocking, with respect to a central portion of said zone plate and a plurality of ring zones of said zone plate around the central portion, the advancement of a ray along the optical axis of said zone plate.

17. An imaging system according to claim 10, wherein the following condition is satisfied:

$$0.1 \leq 0.257831 \times [(f\lambda)/(rn)^2] \times (\lambda/\Delta\lambda) \leq 10$$

where $\lambda$ is the center wavelength of the spectrum of a reflected beam to be collected on the object, $\Delta\lambda$ is a half width of the spectrum, f is the focal length of said zone plate with respect to the center wavelength, and rn is the radius of said zone plate.

18. An imaging system according to claim 17, wherein the following condition is satisfied:

$$0.3 \leq 0.257831 \times [(f\lambda)/(rn)^2] \times (\lambda/\Delta\lambda) \leq 1$$

19. An imaging system according to claim 10, wherein, with respect to a predetermined direction along the surface of said mirror, the thickness of said multilayered film of said mirror changes so as to compensate a change in wavelength of a reflected beam dependent upon the position on said mirror.

20. An X-ray microscope, comprising:
   an X-ray source for supplying X-rays;
   a concave mirror with a multilayered film, for reflecting the X-rays and collecting them onto a sample;
   a zone plate for forming a magnified image of the sample irradiated with the X-rays; and
   a detector for detecting the formed image.

21. An X-ray microscope according to claim 20, wherein said X-ray source comprises a laser and a target for receiving a laser beam from said laser and for producing X-rays.

22. An X-ray microscope according to claim 20, wherein said X-ray source comprises a synchrotron.

23. An X-ray microscope according to claim 20, wherein said mirror forms a reflected beam which is inclined with respect to an optical axis of said zone plate.

24. An X-ray microscope according to claim 23, wherein said mirror has a first portion having a first reflectivity, for receiving a central portion of the X-ray beam, and a second portion having a second reflectivity, for receiving the remaining portion of the X-ray beam, and wherein the first reflectivity is lower than the second reflectivity.

25. An X-ray microscope according to claim 23, wherein said first portion is not covered by said multilayered film.

26. An X-ray microscope according to claim 24, wherein at said first portion the multilayered film structure has been destroyed.

27. An X-ray microscope according to claim 23, further comprising a filter for preventing a ray, emanating from the object along an optical axis of said zone plate, from being superposed on the formed image.

28. An X-ray microscope according to claim 27, wherein said filter is an apertured member.

29. An X-ray microscope according to claim 20, further comprising a blocking member for blocking, with respect to a central portion of said zone plate and a plurality of ring zones of said zone plate around the central portion, the advancement of a ray along the optical axis of said zone plate.

30. An X-ray microscope according to claim 20, wherein the following condition is satisfied:

$$0.1 \leq 0.257831 \times [(f\lambda)/(rn)^2] \times (\lambda/\lambda\Delta) \leq 10$$

where λ is the center wavelength of the spectrum of a reflected beam to be collected on the object, Δλ is a half width of the spectrum, f is the focal length of said zone plate with respect to the center wavelength, and rn is the radius of said zone plate.

31. An X-ray microscope according to claim 30, wherein the following condition is satisfied:

$$0.3 \leq 0.257831 \times [(f\lambda)/(rn)^2] \times (\lambda/\Delta\lambda) \leq 1$$

32. An X-ray microscope according to claim 20, wherein, with respect to a predetermined direction along the surface of said mirror, the thickness of said multilayered film of said mirror changes so as to compensate a change in wavelength of a reflected beam dependent upon the position on said mirror.

33. A method of imaging an object illuminated by an X-ray beam, through a zone plate, to detect an image of the object, comprising the steps of:
    disposing a concave mirror with a multilayered film in a path of the X-ray beam;
    reflecting the X-ray beam;
    reflecting the X-ray beam from the concave mirror with the multilayered film; and
    collecting the reflected X-ray beam onto the object.

34. A method according to claim 33, wherein the disposing of the mirror includes positioning the mirror to form a reflected beam which is inclined with respect to an optical axis of the zone plate.

35. A method according to claim 34, wherein a central portion of the X-ray beam is received by a a first portion of the mirror having a first reflectivity, and a remaining portion of the X-ray beam is received by a second portion of the mirror having a second reflectivity, and wherein the first reflectivity is lower than the second reflectivity.

36. A method according to claim 35, wherein the first portion is not covered by the multilayered film.

37. A method according to claim 35, wherein at the first portion the multilayered film structure has been destroyed.

38. A method according to claims 33 or 34, further comprising the steps of detecting a formed image of the object and preventing a ray emanating from the object along an optical axis of the zone plate from being superposed on the formed image.

39. A method according to claim 38, further comprising blocking with respect to a central portion of the zone plate and a plurality of ring zones of the zone plate around the central portion, the advancement of a ray along the optical axis of the zone plate.

40. A method according to claim 33, wherein the following condition is satisfied:

$$0.1 \leq 0.257831 \times [(f\lambda)/(rn)^2] \times (\lambda/\Delta\lambda) \leq 10$$

where λ is the center wavelength of the spectrum of a reflected beam to be collected on the object, Δλ is a half width of the spectrum, f is the focal length of the zone plate with respect to the center wavelength, and rn is the radius of the zone plate.

41. A method according to claim 40, wherein the following condition is satisfied:

$$0.3 \leq 0.257831 \times [(f\lambda)/(rn)^2] \times (\lambda/\Delta\lambda) \leq 1$$

42. A method according to claim 33, further comprising changing the thickness of the multilayered film of the mirror with respect to a predetermined direction along the surface of the mirror to compensate for a change in wavelength of a reflected beam dependent upon the position on the mirror.

43. A method of imaging an object illuminated by an X-ray beam, comprising the steps of:
    reflecting the X-ray beam on a multilayered film mirror; and
    collecting the reflected X-ray beam on the object; and
    imaging the object through a zone plate.

44. A method of detecting an image of an object illuminated by an X-ray beam comprising the steps of:
    reflecting the X-ray beam on a multilayered film mirror;
    collecting the reflected X-ray beam on the object; and
    imaging the object through a zone plate.

45. An X-ray microscope according to claim 20, wherein said detector comprises a photographic film.

46. An apparatus for exposing a radiation sensitive material, comprising:
    an X-ray source for supplying X-rays;
    a concave mirror with an multilayered film, for reflecting the X-rays and for collecting them onto an object; and
    a zone plate for forming an image of the object, irradiated with the X-rays, on the radiation sensitive material for exposure thereof.

47. An apparatus according to claim 46, wherein said radiation sensitive material comprises a photographic film.

* * * * *

UNITED STATES PATENT AND TRADEMARK OFFICE
CERTIFICATE OF CORRECTION

PATENT NO. : 5,204,887

DATED : April 20, 1993

INVENTOR(S) : MASAMI HAYASHIDA, ET AL.

Page 1 of 3

It is certified that error appears in the above-identified patent and that said Letters Patent is hereby corrected as shown below:

ON THE TITLE PAGE:
IN [56] REFERENCES CITED

Under FOREIGN PATENT DOCUMENTS:
"1119800  11/1989  Japan" should read
--1-119800  5/1989  Japan-- and
"3071100  3/1991  Japan" should read
--3-71100  3/1991  Japan--.

Under OTHER PUBLICATIONS:
"laser produced" should read --laser-produced--;
"photolectron" should read --photoelectron--;
"alladdin"," should read --Aladdin",--;
"No.1,Apr. 1988," should read --Nos. 1-3, Apr. 1988,--;
and "Methods Section a." should read --Methods in
Physics Research. Sec. A,--.

COLUMN 1

Line 66, "it-is" should read --it is--.

COLUMN 2

Line 28, "increasing" should read --increase--.
Line 31, "$\pi$" should read --$\pi$,--.

COLUMN 3

Line 18, "collect" should read --collecting--.
Line 31, "is-reflected" should read --is reflected--.
Line 43, "portion" should read --portion of--.

UNITED STATES PATENT AND TRADEMARK OFFICE
CERTIFICATE OF CORRECTION

PATENT NO. : 5,204,887
DATED : April 20, 1993
INVENTOR(S) : MASAMI HAYASHIDA, ET AL.

Page 2 of 3

It is certified that error appears in the above-identified patent and that said Letters Patent is hereby corrected as shown below:

COLUMN 4

Line 29, "2 Årms" should read --2 Å rms--.
Line 52, "Å A" should read --Å-- and
"20.1 521" should read --20.1 Å--.

COLUMN 5

Line 6, "by" should be deleted.
Line 9, "originally" should read --originally be--.
Line 24, "fifty five)." should read --fifty one).--.

COLUMN 6

Line 16, "depicts" should read --depict--.
Line 29, "W∞P⁻ˣ" should read --W∝P⁻ˣ--.

COLUMN 7

Line 29, "uses" should read --use--.

COLUMN 9

Line 12, "aperture" (second occurrence) should be deleted.
Line 42, "Arms" should read --Å rms--.
Line 46, "center" should read --center of--.

COLUMN 10

Line 15, "of regards" should read --to-- and
"pate 17" should read --plate 17--.
Line 66, "a a" should read --a--.

UNITED STATES PATENT AND TRADEMARK OFFICE
CERTIFICATE OF CORRECTION

PATENT NO. : 5,204,887
DATED : April 20, 1993
INVENTOR(S) : MASAMI HAYASHIDA, ET AL.

It is certified that error appears in the above-identified patent and that said Letters Patent is hereby corrected as shown below:

COLUMN 11

Line 7, "and" should read --the--.
Line 13, "formed." should read --formed image.--.
Line 24, "$\lambda$is" should read --$\lambda$ is--.

COLUMN 13

Line 23 should be deleted.
Line 32, "a a" should read --a--.

COLUMN 14

Line 42, "an" should read --a--.

Signed and Sealed this

Nineteenth Day of April, 1994

BRUCE LEHMAN

Attest:

Attesting Officer    Commissioner of Patents and Trademarks